United States Patent
Waters et al.

(10) Patent No.: US 6,550,330 B1
(45) Date of Patent: Apr. 22, 2003

(54) DIFFERENTIAL AMPLIFICATION FOR MICRO-ELECTRO-MECHANICAL ULTRA-SENSITIVE ACCELEROMETER

(75) Inventors: Richard L. Waters, San Diego, CA (US); Chris Hutchens, Stillwater, OK (US); Monti E. Aklufi, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/886,293

(22) Filed: Jun. 21, 2001

Related U.S. Application Data

(63) Continuation-in-part of application No. 09/808,570, filed on Mar. 14, 2001.

(51) Int. Cl.[7] .............................. G01P 15/00; G01B 9/02
(52) U.S. Cl. ..................................... 73/514.26; 356/454
(58) Field of Search ........................ 73/514.26, 514.19, 73/514.27, 514.16, 514.01, 657; 356/337, 450, 454; 250/227.14, 227.18, 227.19

(56) References Cited

U.S. PATENT DOCUMENTS

| | | | |
|---|---|---|---|
| 3,946,616 A | * | 3/1976 | Jones, Jr. et al. ............. 356/28 |
| 3,996,461 A | | 12/1976 | Sulzbach et al. |
| 4,158,133 A | | 6/1979 | Spaeth et al. |
| 4,422,331 A | * | 12/1983 | Walker ..................... 73/862.38 |
| 4,452,533 A | * | 6/1984 | Miles et al. ................. 356/352 |
| 4,815,321 A | | 3/1989 | Malvern |
| 5,216,237 A | | 6/1993 | Ritchie et al. |
| 5,449,909 A | | 9/1995 | Kaiser et al. |
| 5,559,358 A | * | 9/1996 | Burns et al. ............. 73/862.59 |
| 5,936,294 A | * | 8/1999 | Zhang ..................... 73/514.26 |
| 6,350,983 B1 | * | 2/2002 | Kaldor et al. ............ 73/514.26 |

OTHER PUBLICATIONS

Waters, R. L. et al., "Micromachanical Optoelectronic Switch and Amplifier (MIMOSA)", *IEEE Journal of Selected Topics in Quantum Electronics*, vol. 5, No. 1, Jan./Feb. 1999, pp. 33–35.

* cited by examiner

*Primary Examiner*—Helen Kwok
(74) *Attorney, Agent, or Firm*—Peter A. Lipovsky; James A. Ward; Michael A. Kagan

(57) ABSTRACT

An improvement to an optical accelerometer based upon the monolithic integration of a Fabry-Perot interferometer and a $p^+n$ silicon photosensor includes using one or more pairs of optical accelerometers wherein each pair provides for greater accelerometer sensitivity than a single independent accelerometer, and allows for a reduction in common mode noise due to amplitude and phase difference variations of the utilized light source as well as supply voltage. The differential approach of the invention provides for the biasing of the optical accelerometers such that their output signals are 180 degrees out of phase with each other.

17 Claims, 8 Drawing Sheets

DIFFERENTIAL AMPLIFICATION FOR MICRO-ELECTRO-MECHANICAL ULTRA-SENSITIVE ACCELEROMETER

CROSS-REFERENCE TO RELATED APPLICATION

This application is a continuation-in-part of U.S. patent application Ser. No. 09/808,570 filed Mar. 14, 2001 by inventors Richard L. Waters and Monti E. Aklufi titled "Micro-electro-mechanical Ultra-Sensitive Accelerometer" and, incorporated by reference herein.

BACKGROUND OF THE INVENTION

This invention relates generally to perceiving acceleration upon an object. More specifically the invention relates to the devices used for making such perceptions, known as accelerometers. In greater specificity, the invention relates to an optical accelerometer system created through the technology known as micro-electro-mechanical systems or "MEMS".

In the above U.S. patent application, there is disclosed a micro-electro-mechanical ultra-sensitive optical accelerometer. This device has been coined the name MEMS USA by its inventors. The MEMS USA embodiment disclosed as an example in the cited patent application is based upon the monolithic integration of an interferometer and a photodiode. Such an accelerometer is shown generally in FIG. 1.

FIG. 1 illustrates in a simplified depiction how a Fabry-Perot optical resonator is created by using two reflective mirrored surfaces that are partially transmitting and that are separated by a distance, d. If monochromatic light is illuminated onto the upper mirror and the distance between the mirrors is an integral multiple of half wavelengths of the monochromatic light, then a resonant condition will exist within the cavity created by the mirrors. A light transmission peak through the bottom mirror will occur.

If the distance between the mirrors is not an integral multiple of half wavelengths of the incoming light, then destructive interference will occur within the cavity and the transmission will be exponentially attenuated.

In the optical accelerometer disclosed in the referenced patent application, the mirror distance is initially adjusted to maximize transmission of light though the cavity. One mirror, such as the top mirror, is used as a proof mass and is hinged or supported in such a way to allow movement with respect to the other mirror due to an external force such as acceleration. Any displacement in the upper mirror will therefore cause a decrease the light transmission through the cavity. The photodiode shown in FIG. 1 is monolithically integrated with the Fabry-Perot cavity so that a change in transmitted light is easily detected and recognized as a change in the optically generated current $I_{pd}$ of the photodiode. Thus, by monitoring the photodiode current, a measure of acceleration can be obtained.

FIG. 2 illustrates such a combination of Fabry-Perot cavity 10 and photodiode 12. In this instance an air-silicon interface makes up lower mirror 14, although as explained in the cited patent application, other mirror configurations can be used such as dielectric stacks. Upper mirror 16 consists of either a partially transmitting dielectric stack or a thin layer of metal on a transparent or semitransparent membrane, for example.

FIG. 3 shows the measured and predicted output for the device of FIG. 2. In this instance an electrostatic force ($V_m$) is used to vary the distance between upper mirror 16 and lower mirror 14. The plot in FIG. 3 shows the change in photocurrent generated by the photodiode as the electrostatic force ($V_m$), and hence the distance between the mirrors, is varied. Multiple peaks occur in the transmitted light due to the existence of several resonance points within the particular tested system and for the initial airgap distance of the fabricated device.

FIG. 4 shows a biasing scheme by which the MEMS USA accelerometer of the previously cited patent application generates a family of curves similar to that of a metal-oxide-field-effect-transistor (MOSFET), illustrating that the device possesses "transistor-like" characteristics. In the accelerometer field, this amplification characteristic can be highly advantageous, as all prior art accelerometers detect a displacement that is then fed to the input of an amplifier, leading to unwanted noise. The MEMS USA becomes an amplifier itself whose output can be used as the input stage of a low noise amplifier, greatly reducing noise.

In this configuration, photodiode voltage ($V_{pd}$) designates the reverse bias regime such that the diode is turned "on" for negative voltages. Here voltage $V_{pd}$ is used to bias the pn photodiode and is swept (increased or decreased) under reverse bias conditions. By using bias voltage $V_m$ to keep the force across the mirrors constant, one of the curves shown in FIG. 5 is created. Adjusting the force across the mirrors and again sweeping bias voltage $V_{pd}$ across the photodiode results in a second distinct curve. Thus by discretely changing the force exerted on the upper mirror and sweeping the photodiode voltage, a family of curves can be generated.

The MEM USA device thus appears to take the characteristics of a three terminal device with the upper mirror acting like the gate electrode of a MOSFET. However, unlike the MOSFET, minority carriers in the form of photo-generated electron hole pairs are introduced into the depletion region of the pn photodiode much like that of a bipolar junction transistor (BJT).

By biasing the optical accelerometer with an ideal load in the form of a current source and monitoring the voltage across the photodiode, a mechanism to amplify small displacements in the upper mirror due to a perturbing force can be realized.

SUMMARY OF THE INVENTION

In the immediate invention, the MEMS USA device of above-referenced patent application is arranged in one or more pairs of cooperating accelerometer cells whose outputs are differentiated (output difference is ascertained). This configuration provides for even greater accelerometer sensitivity than a single independent accelerometer cell, and allows for a reduction in common mode noise due to amplitude and phase difference variations of the utilized light source as well as supply voltage or any other noise common to the pair of accelerometers. The differential approach of the invention provides for the biasing of the MEMS-based optical accelerometers such that their output signals are 180 degrees out of phase with each other.

Other objects, advantages and new features of the invention will become apparent from the following detailed description of the invention when considered in conjunction with the accompanied drawings.

DESCRIPTION OF THE INVENTION

Figure 1:
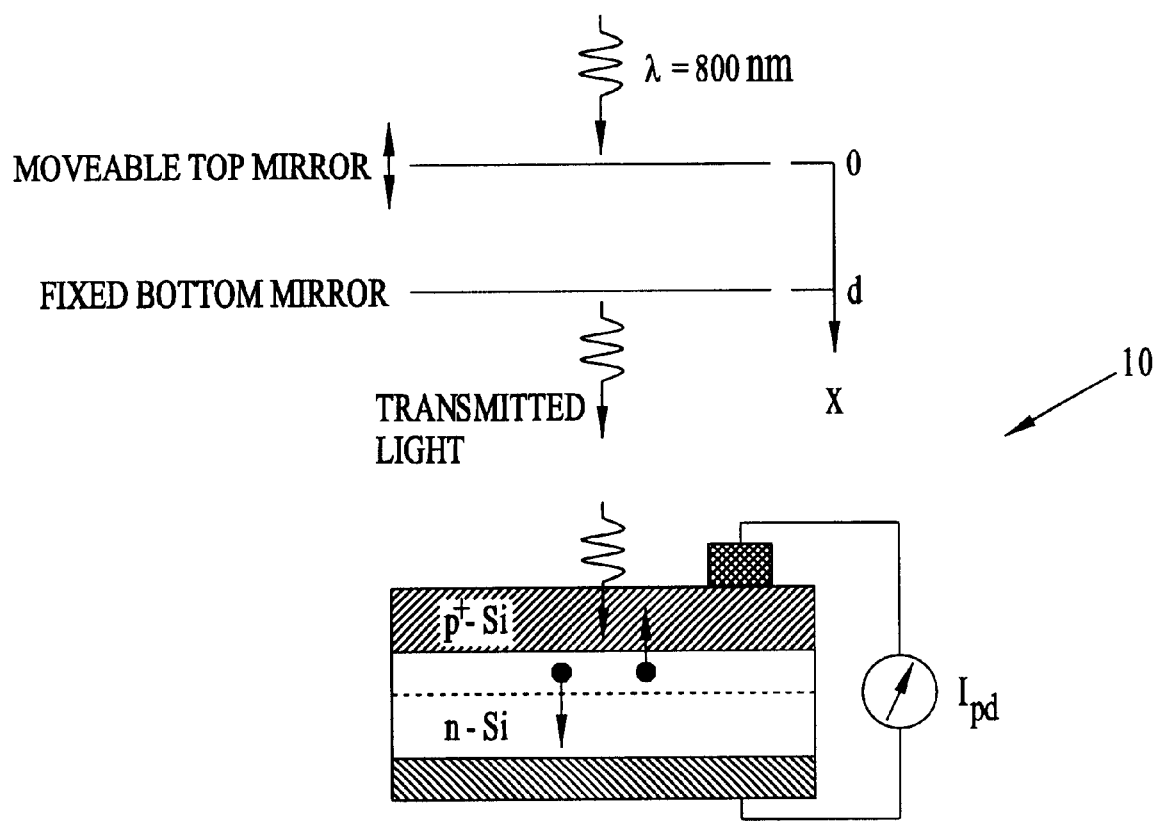
FIG. 1 is a partial symbol, partial side-section view of an exemplary optical accelerometer as may be used in the invention.
Figure 2:
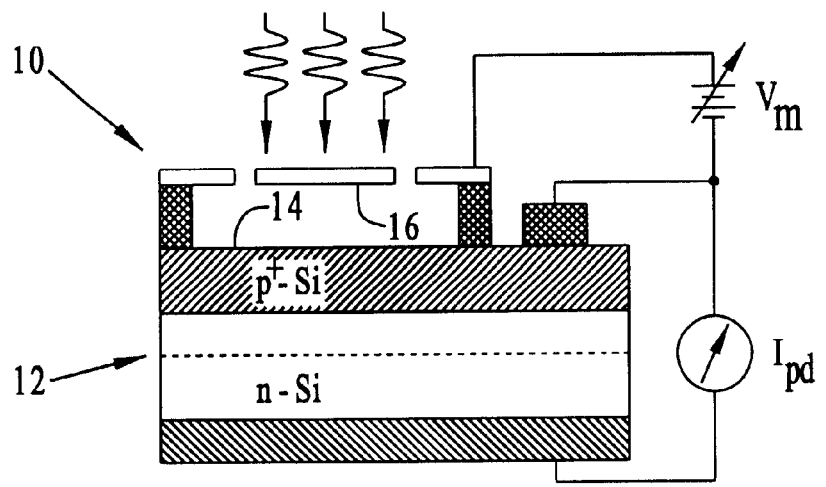
FIG. 2 illustrates an exemplary mechanism for adjusting airgap distance of an optical accelerometer's interferometer thereby modulating the transmission of light into an underlying photosensor.
Figure 3:
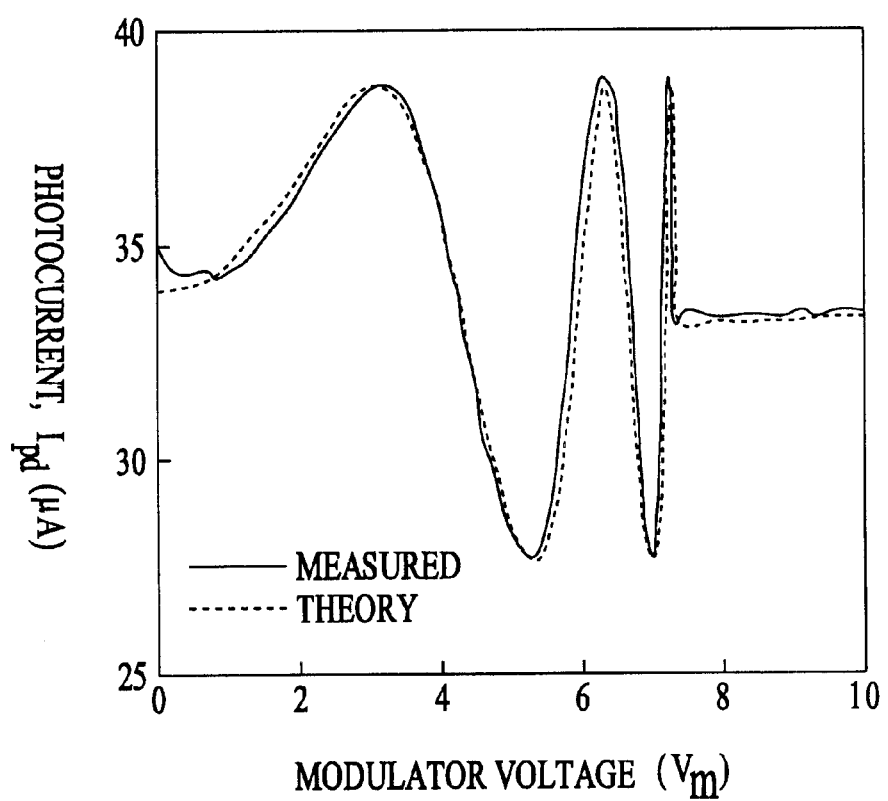
FIG. 3 shows graphically how modulating the airgap distance of an optical accelerometer's interferometer affects the transmission of light through the interferometer and thereby alters the accelerometer's generated photocurrent.
Figure 4:
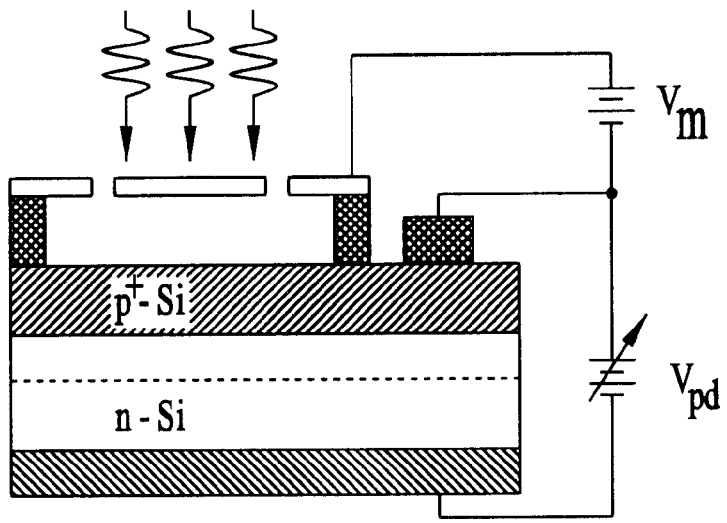
FIG. 4 illustrates an exemplary voltage biasing mechanism for modulating an optical accelerometer's interferometer gap distance and a separate voltage biasing mechanism for modulating photodiode photocurrent.
Figure 5:
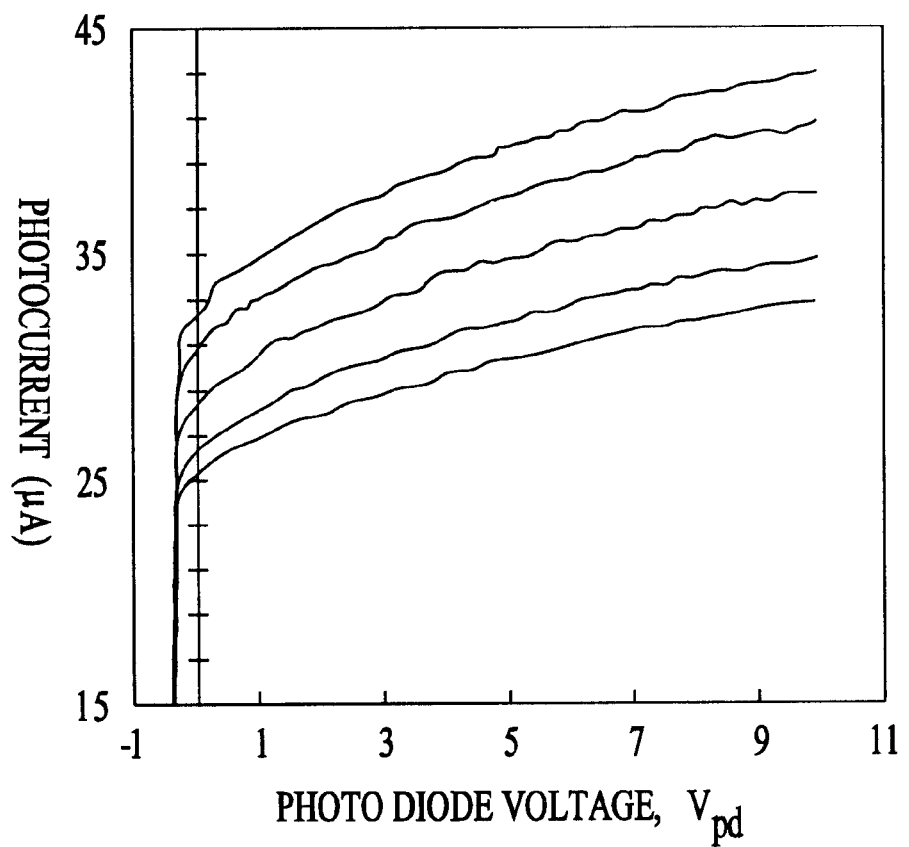
FIG. 5 is a graphical representation of the relationship between photodiode voltage biasing and generated photodiode photocurrent corresponding to an optical accelerometer as may be used in the invention.

Referring to FIG. 1, a micro-electro-mechanical system ultra-sensitive accelerometer (MEMS USA) 1 as described in the above-cited patent application is shown by way of example. Accelerometer 1 lends itself to being made according to well-understood steps familiar to the semiconductor processing field and the MEMS world. Further description of this processing will not be described here.

According to the present invention, use of the MEMS USA accelerometer can be made more sensitive by utilizing a differential amplification scheme in which two optical accelerometers are used. More importantly, a differential pair arrangement provides for the reduction of common mode signals which may arise from multiple sources such as the laser light source and power supply voltage, among others.

The accelerometers employed are substantially identical in all respects except for their initial airgap distance. This airgap distance can be tightly controlled during the fabrication process. If the fabricated heights differ from desired values, the heights can be fine-tuned such as by electronics via an electrostatic potential (force).

Figure 6A:
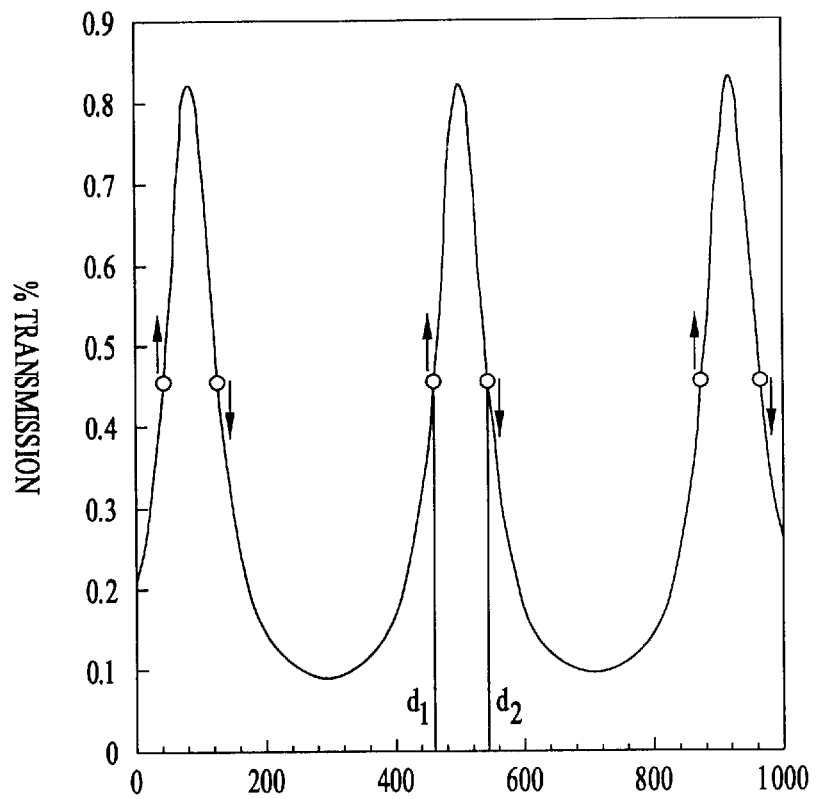
FIGS. 6A and 6B illustrate, respectively, a graphical depiction of the relationship between an optical accelerometer's light transmission versus interferometer gap distance for a given light source, and an example embodiment of the invention employing two optical accelerometers.
Figure 6B:
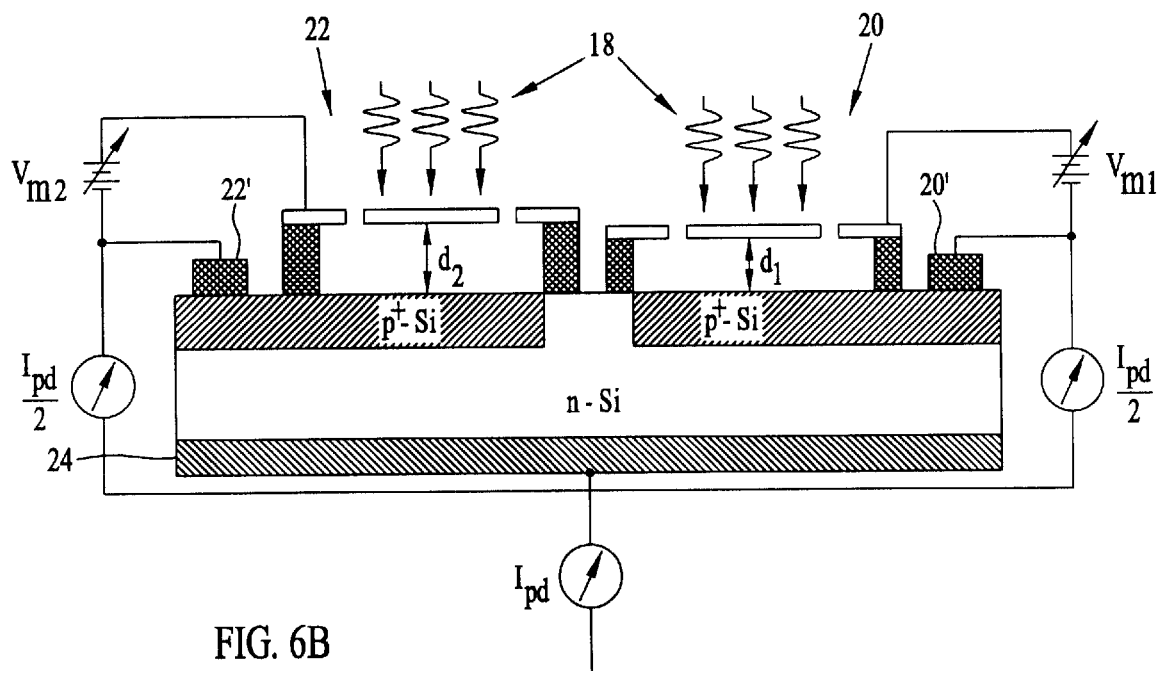

FIGS. 6A and 6B describe in general this invention. FIG. 6A shows the change in light transmission and hence photocurrent as a function of accelerometer mirror spacing. Referring to FIG. 6B, as per the relationship shown in FIG. 6A, and for a given wavelength of irradiating light 18, if one accelerometer 20 is fabricated with a nominal airgap $d_1$ on the rise of a resonance peak and a second 22 is fabricated with a different nominal airgap $d_2$ on the fall of a resonance peak, then any external force applied will cause the photocurrent in device 20 to increase while that of device 22 decreases. By biasing both devices with an equal amount of current ($I_{pd}/2$), such as through conductive pads 20', 22' and 24, it is possible to differentially amplify the small change in voltages generated across the photodiodes. As will be described in greater detail, variable electrostatic potentials, $V_{m1}$ and $V_{m2}$ are provided to create a selected electrostatic potential between the mirrors of accelerometers 20 and 22, respectively, so that the airgaps between these mirrors can be set by a user.

Of course alternative initial mirror airgap distances can be used other than those shown in FIG. 6A. In addition, the two initial airgaps need not be on the rise and fall of the same resonance peak.

The accelerometer system of FIG. 6 is designed for heightened accelerometer system sensitivity. One accelerometer is set to operate such that it is on an upward slope of photocurrent versus change in gap distance while the other is set to operate on a decreasing slope of photocurrent versus change in gap distance. By operating one device at the halfway point between the maximum and minimum transmission value on an increasing slope and the other at the same transmission value but on a decreasing slope, the linear range in either of the two possible directions normal to the surface of the top mirror is identical. Operating the differential pair at anything other than the halfway point between the minimum and maximum transmission levels will decrease the effective range in one direction while increasing it in the other.

Figure 7A:
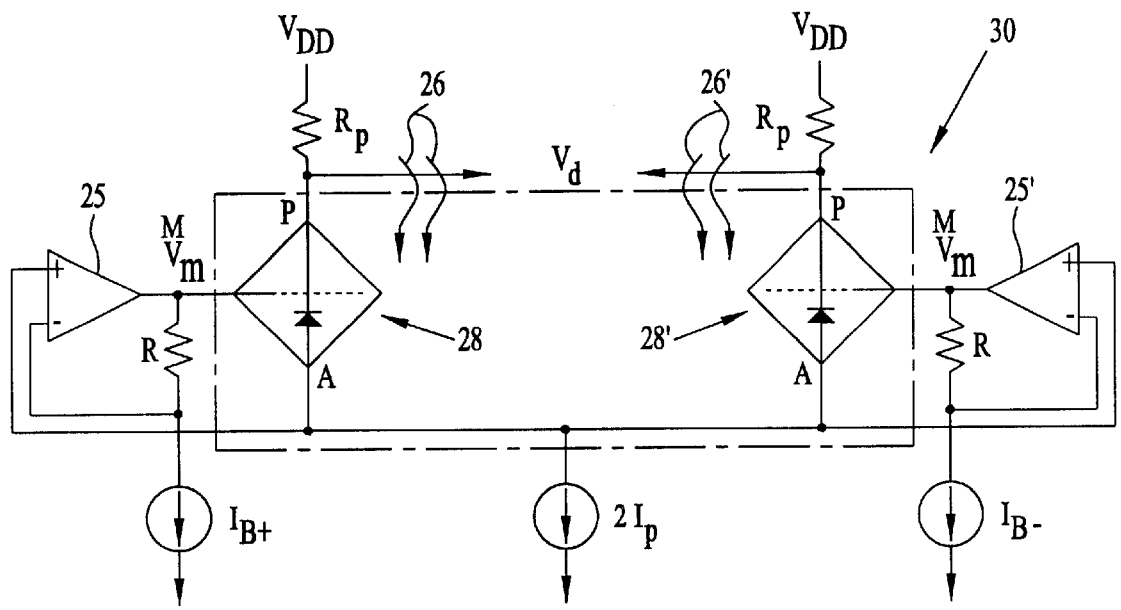
FIGS. 7A–7C illustrate in circuit diagram format three example embodiments of the invention.
Figure 7B:
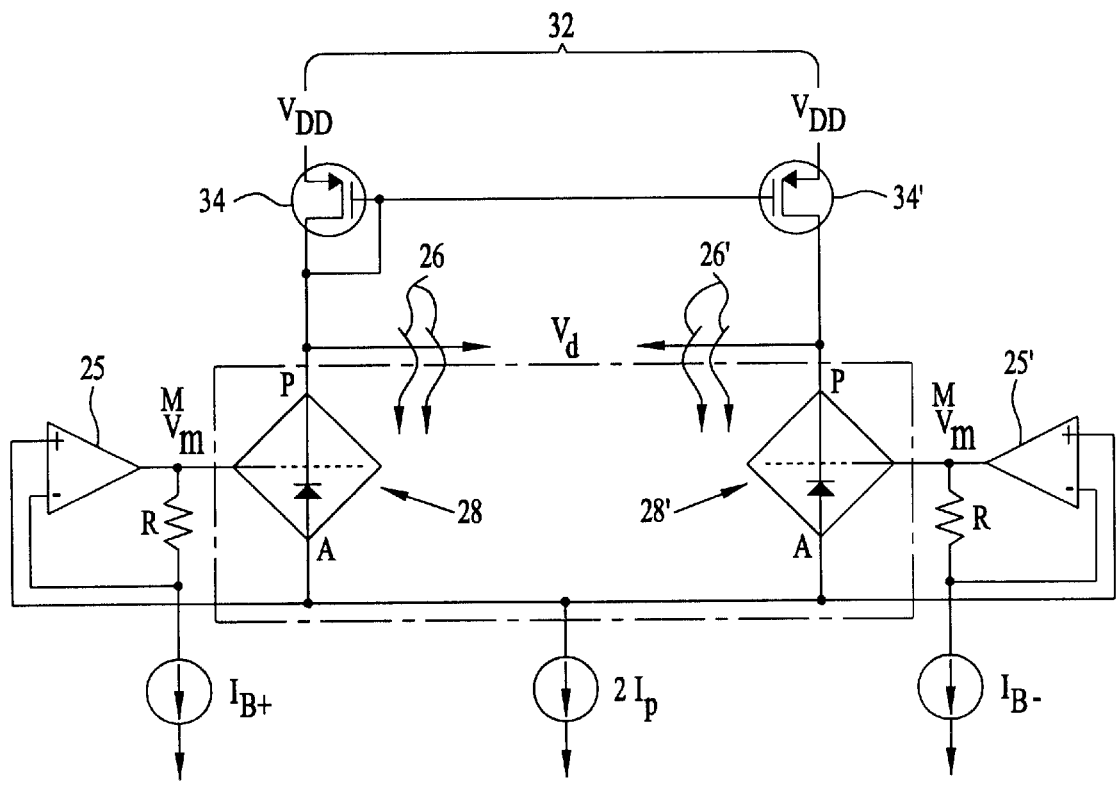
Figure 7C:
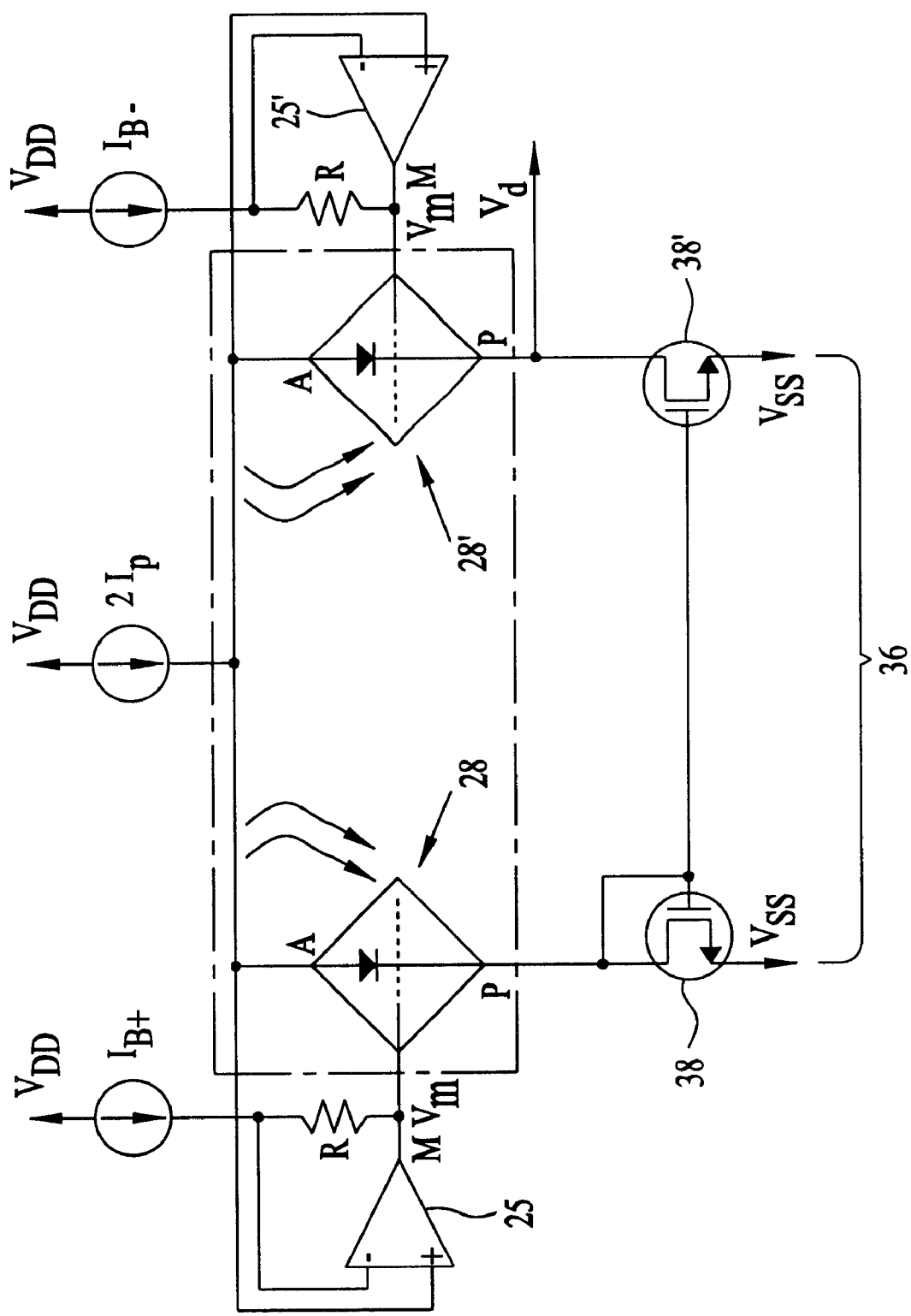

Referring now to FIGS. 7A–7C, three example embodiments of the invention are shown in circuit form. The differential amplification schemes described in these three embodiment are all suitable for direct integration into complimentary-metal-oxide-semiconductor (CMOS) technology. As will be explained in greater detail, FIG. 7A incorporates a resistive load in a common anode configuration, FIG. 7B uses a p-type metal-oxide-semiconductor (PMOS) current mirror for a common anode configuration, and FIG. 7C includes an n-type metal-oxide-semiconductor (NMOS) current mirror for a common cathode configuration.

Before the details of these examples are explained, the following is an explanation of circuit symbols used in these circuit diagrams. Each of the employed optical accelerometers has the following four terminals:

The light input which is used to illuminate the movable mirror (proof mass) of the accelerometer and in turn the accelerometer's interferometer cavity (shown as double wavy arrows);

M=the mechanical proof of mass mirror where a bias voltage $V_m$ is applied;

P=the cathode of the accelerometer's photodiode; and

A=the anode of the accelerometer's photodiode.

Voltage $V_{MA}$ is the voltage applied to the movable mirror M (proof of mass) of the accelerometer and is used to apply a bias/control voltage to the set the accelerometer's mirror airgap distance and can also be used as a feedback voltage to maintain a constant proof mass (mirror) position. The result of feedback positioning is two-fold, linearization of the sensor and a signal voltage directly proportional to acceleration.

The voltage $V_{PA}$ provides a reverse bias voltage for the accelerometer's photodiode. All movement in the proof of mass results in a modulation of the photo current with the resulting current signal voltage ($v_p$) being impressed across the driving point impedance at node P.

For each of the examples of the invention given in FIGS. 7A–7C, all accelerometers have a movable mirror adjusting circuit that permits the airgap between the mirrors of the interferometer section of the accelerometer to be adjusted. This circuit includes an opamp (shown as 25 and 25'), a resistor R and current source $I_{B+}$ or $I_{B-}$ to establish and maintain bias voltage $V_{MA}$. Voltage $V_{MA}$ (such as $V_{m1}$ in FIG. 6A) allows for dynamic position control of the gap between the accelerometer's mirrors ($d_1$ in FIG. 6B).

Referring now to FIG. 7A, photons 26 and 26' are applied by a light source such as a laser (not shown) to a movable mirror shown generally as part of optical accelerometers 28 and 28'. As a result of interaction between laser light input (photons), the mirror proof mass and the photodiode detector (also shown generally at 28 and 28'), a current signal results at the P terminal which can be impressed across a resistor, for example, load resistor $R_p$ in FIG. 7A. Direct current (DC) bias voltages are applied and maintained between terminals M and A and P and A. The photo diode dark current ($2I_p$), resistor drop $I_p R_p$ and supply voltage $V_{DD}$ establish the required photo diode bias voltage $V_{PA}$.

The output or differential information of the two accelerometers is developed by subtracting the two voltages developed at nodes P. The accelerometer signals are a result of changing accelerometer photocurrents caused by changing the position of the accelerometer's proof masses, thereby creating a voltage drop across resistor pair $R_p$.

As a result of differential operation in FIG. 7A, the gain of accelerometer differential system 30 can be written as:

$A_{diff}$=2 $gm_a R_p$ (volts/unit gravity (g)).

Where $gm_a$ has the units of $\mu A/g$ and $R_p$ is the load at the phonic output of each accelerometer. For example, if $gm_a$ is equal to 1 $\mu A/g$ and $R_p$ equals 50 Kohms, the differential output is 100 mV/g with an effective noise floor of 40 $nV/Hz^{1/2}$. The thermal noise due to $R_p$ is assumed to be the dominant noise contributor when compared to the proof mass noise (Brownian motion) and diode shot noise. For a bandwidth of 500 Hz (Vnoise equals 0.9 $\mu V$) and with a desired SNR of 12 dB, the minimum detectable g signal is approximately 25 $\mu g$. Alternate configurations exist for both the sensor design as well as the electronics that allow for an even lower noise floor and greater sensitivity.

FIGS. 7B and 7C are circuit diagrams depicting the accelerometer system of the invention in which the two load resistors $R_p$ are replaced with PMOS and NMOS current mirrors, respectively.

FIG. 7B shows an embodiment of the invention using a PMOS current mirror 32, that includes PMOS transistors 34 and 34' used in a common anode configuration. FIG. 7C is an embodiment of the invention in which an NMOS current mirror 36 including NMOS transistors 38 and 38' in a common cathode configuration is shown. Both embodiments provide a mechanism to subtract the two acceleration generated currents from the P nodes of the optical accelerometers and to impress the resulting current summing across the driving point impedance at either of the P nodes where the MOS device does not have its gate and drain shorted. This results in a single output voltage, and a circuit which is more readily integrated in VLSI CMOS, often resulting in circuits with higher gain, better yield, and lower noise. In an alternative configuration, the differential signals resulting at the two P nodes are not combined until much later in the signal processing stage. For example, if the two P nodes are fed to a sigma-delta analog-to-digital convertor, the differential information could then be combined at down sampling or at the input to the decimation filter.

Figure 8:
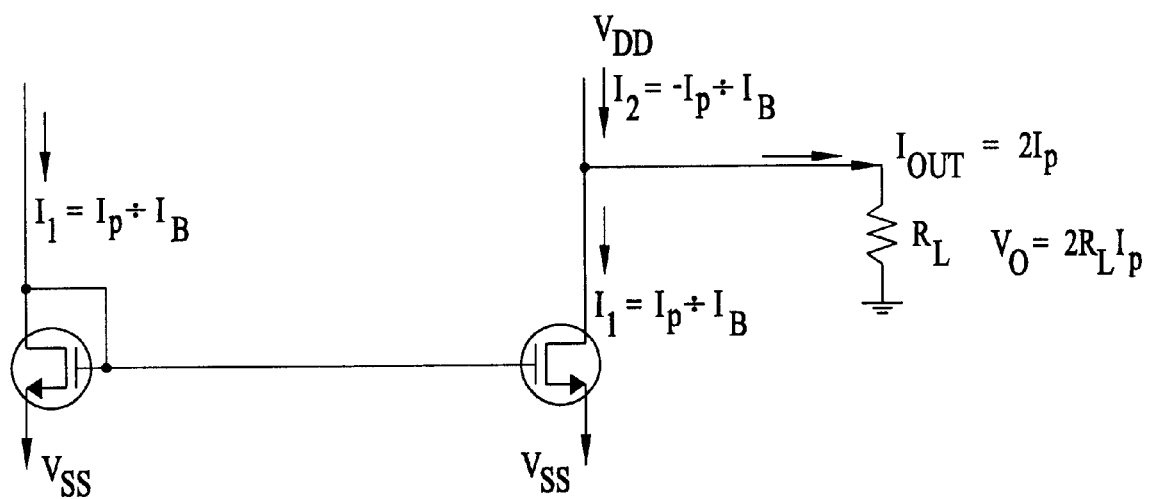
FIG. 8 describes in circuit format an exemplary current mirror operation as used in the embodiment of the invention shown in FIG. 7C.

FIG. 8 shows current mirror operation used in the summation of currents for the embodiment of FIG. 7C. The voltage Vss is a supply voltage for transistors 38 and 38'.

Figure 9:
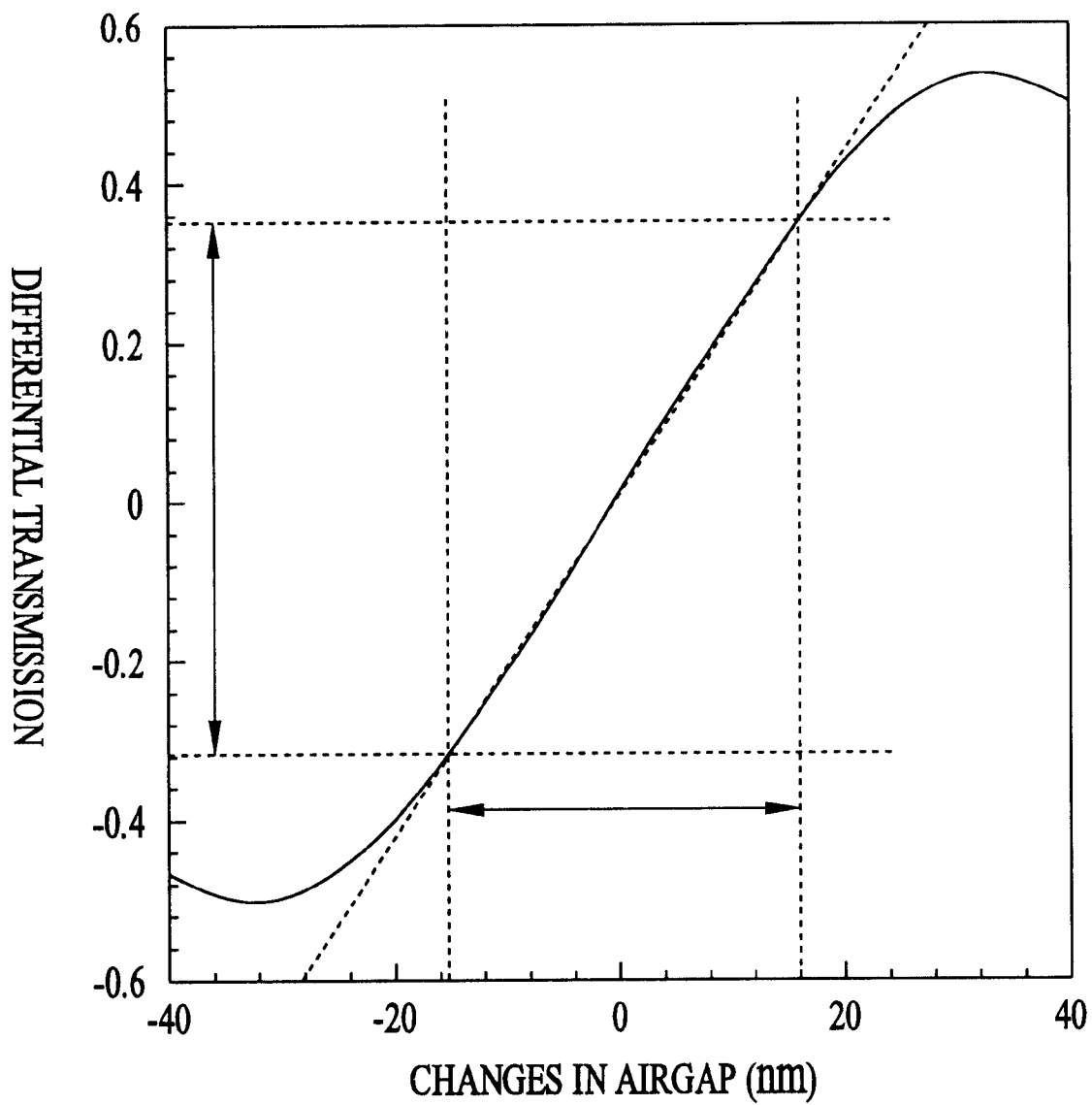
FIG. 9 provides a graphical representation of an exemplary numerical simulation of the differential approach of the invention over one particular linear range.

FIG. 9 shows the differential change in photocurrent as a function of the change in upper mirror distance due to an applied force. This numerical simulation assumes that both devices are being operated at the halfway point between maximum and minimum transmission levels, further it assumes that one accelerometer has an initial airgap such that it provides an increase in current versus force slope while the second accelerometer is on a decreasing current versus force slope. In addition, alternative ranges exist that are not shown in FIG. 9 for higher displacements and therefor higher g forces.

The differential approach to using the optical accelerometers of the above-cited patent application provides the following:

i) Output signals due to the forces of acceleration are equal in amplitude and 180 degrees out of phase to the extent that the two accelerometer cells and their loads ($R_p$ or current mirrors) match.

ii) All amplitude variations in laser intensity and power supply voltages appear as common mode signals to the extent that the two accelerometer cells and their loads ($R_p$ or current mirrors) match.

iii) Independent trimming of bias currents $I_{B+}$ and $I_{B-}$ allows for gain matching in the two accelerometers.

iv) All even terms of the accelerometers' spring constant non-linearity will cancel when the two accelerometer terms are added differentially. As a result, distortion for large g deflections, i.e 3–5 g forces, will then be dominated by the 3rd and $5^{th}$ order terms.

v) The CMOS implementations of the invention will allow for local and/or global application feedback, chopper stabilization to assist in temperature stability, enhanced sensor linearization, reduced 1/f noise and integration as a part of an analog to digital converter.

Though the invention has been described as using two optical accelerometers as a system, there are instances where it may be desired to use sets of the systems wherein a difference of the difference is taken. In other words, using two sets of differential amplifiers and then taking the difference of the outputs for the two differential amplifiers systems. This would include a total of 4 accelerometer cells. Such as technique could be further elaborated by adding more cells in groups of 8, 16 etc.

Further, an alternative optical accelerometer system is envisioned wherein a single optical accelerometer cell is used in conjunction with a second similar cell but one having a fixed interferometer gap. The outputs of the cells are then differentiated to produce a combined output wherein noise common to the cells is reduced. Such an implementation could also be employed in multiple two celled systems wherein the difference between the systems is taken.

Obviously, many modifications and variations of the invention are possible in light of the above description. It is therefore to be understood that within the scope of the claims the invention may be practiced otherwise than as has been specifically described.

What is claimed is:

1. A high sensitivity micro-electro-mechanical optical accelerometer system comprising:

first and second substantially identical optical accelerometers each including,
an interferometer, including a pair of partially transmissive, partially reflective, surfaces wherein a first of said surfaces is flexibly suspended adjacent and parallel to a second of said surfaces so that a gap exists therebetween;
a proof mass attached to said flexibly suspended first surface; and
a photosensor attached to one of said surfaces outside of said gap, said photosensor for receiving light through said first and second surfaces wherein said light is also partially reflected between said surfaces;

whereby a change in said gap due to an acceleration force is sensed by a change in said light as detected by said photosensor;

a source of monochromatic light for irradiating said photosensors of said first and second optical accelerometers;

a power supply for biasing said photosensors with a substantially equal amount of current and for providing a common supply voltage to said accelerometer system;

wherein said gap of said first optical accelerometer is set so that said first optical accelerometer provides an increase in light transmission upon initially sensing said acceleration force and said gap of said second optical accelerometers is set so that said second optical accelerometer provides a decrease in light transmission upon initially sensing said acceleration force; and a differential circuit for subtracting a photosensor output of one of said optical accelerometers from a photosensor output of the other of said optical accelerometers.

2. The apparatus of claim 1 wherein said differential circuit includes for each accelerometer photosensor output a load resistor disposed in common anode configuration, said photosensor outputs being impressed across said respective load resistors to provide respective voltages that are subtracted to provide a differential output of said accelerometer system.

3. The apparatus according to claim 2 further including a source of variable electrostatic potential for providing a separate selected electrostatic potential between said first and second surfaces of said interferometers so that said gaps are adjustable.

4. The apparatus of claim 1 wherein said differential circuit includes for each accelerometer photosensor output, impressing said photosensor outputs across a PMOS current mirror disposed in common anode configuration, an output of said PMOS current mirror being a differential output of said accelerometer system.

5. The apparatus according to claim 4 further including a source of variable electrostatic potential for providing a separate selected electrostatic potential between said first and second surfaces of said interferometers so that said gaps are adjustable.

6. The apparatus of claim 1 wherein said differential circuit includes for each accelerometer photosensor output, impressing said photosensor outputs across a NMOS current mirror disposed in common cathode configuration, an output of said NMOS current mirror being a differential output of said accelerometer system.

7. The apparatus according to claim 6 further including a source of variable electrostatic potential for providing a separate selected electrostatic potential between said first and second surfaces of said interferometers so that said gaps are adjustable.

8. The apparatus of claim 1 wherein said photosensor is a photodiode.

9. The apparatus of claim 8 wherein said interfermeter is a Fabry-Perot interferometer.

10. The apparatus of claim 1 wherein said accelerometer system is one of a plurality of an even number of said system wherein outputs of said system are differentiated.

11. A high sensitivity micro-electromechanical optical accelerometer system comprising:

first and second substantially identical optical accelerometers each including, a Fabry-Perot interferometer, including a pair of partially transmissive, partially reflective, surfaces wherein a first of said surfaces is flexibly suspended adjacent and parallel to a second of said surfaces so that a gap exists therebetween;

a proof mass attached to said flexibly suspended first surface;

a photodiode attached to said second surface outside of said gap, said photodiode for receiving light through said first and second surfaces wherein said light is also partially reflected between said surfaces;

whereby a change in said gap due to an acceleration force is sensed by a change in said light as detected by said photodiode;

a source of monochromatic light for irradiating said photodiodes of said first and second optical accelerometers;

a power supply for biasing said photodiodes with a substantially equal amount of current and for providing a common supply voltage to said accelerometer system;

a source of variable electrostatic potential for providing a separate selected electrostatic potential between said first and second surfaces of said interferometers so that said gaps are adjustable;

wherein said gap of said first optical accelerometer is set so that said first optical accelerometer provides an increase in light transmission upon initially sensing said acceleration force and said gap of said second optical accelerometers is set so that said second optical accelerometer provides a decrease in light transmission upon initially sensing said acceleration force; and a differential circuit for subtracting a photodiode output of one of said optical accelerometers from a photodiode output of the other of said optical accelerometers.

12. The apparatus of claim 11 wherein said differential circuit includes for each accelerometer photosensor output a load resistor disposed in common anode configuration, said photosensor outputs being impressed across said respective load resistors to provide respective voltages that are subtracted to provide a differential output of said accelerometer system.

13. The apparatus of claim 12 wherein said first and second optical accelerometers and said differential circuit are monolithically integrated on a single substrate.

14. The apparatus of claim 11 wherein said differential circuit includes for each accelerometer photosensor output, impressing said photosensor outputs across a PMOS current mirror disposed in common anode configuration, an output of said PMOS current mirror being a differential output of said accelerometer system.

15. The apparatus of claim 14 wherein said first and second optical accelerometers and said differential circuit are monolithically integrated on a single substrate.

16. The apparatus of claim 11 wherein said differential circuit includes for each accelerometer photosensor output, impressing said photosensor outputs across a NMOS current mirror disposed in common cathode configuration, an output of said NMOS current mirror being a differential output of said accelerometer system.

17. The apparatus of claim 16 wherein said first and second optical accelerometers and said differential circuit are monolithically intergrated on a single substrate.

* * * * *